United States Patent
Breen et al.

(10) Patent No.: US 8,035,675 B2
(45) Date of Patent: Oct. 11, 2011

(54) ALIGNING BEAMS OVER SUCCESSIVE REFLECTIONS BY FACETS OF ROTATING POLYGONAL MIRROR

(75) Inventors: Craig Breen, Rehovot (IL); Dan Pritsker, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 573 days.

(21) Appl. No.: 12/245,920

(22) Filed: Oct. 6, 2008

(65) Prior Publication Data

US 2010/0085620 A1 Apr. 8, 2010

(51) Int. Cl.
*B41J 2/47* (2006.01)
(52) U.S. Cl. ........................ 347/235; 347/250
(58) Field of Classification Search .................. 347/224, 347/225, 231, 233, 235, 250
See application file for complete search history.

(56) References Cited

U.S. PATENT DOCUMENTS

| | | | |
|---|---|---|---|
| 6,219,085 B1 * | 4/2001 | Hanna | 347/249 |
| 6,493,019 B1 | 12/2002 | Hirasawa | |
| 7,382,385 B2 * | 6/2008 | Breen et al. | 347/116 |
| 7,719,558 B1 * | 5/2010 | Unruh et al. | 347/235 |
| 2002/0071165 A1 | 6/2002 | Hamada | |
| 2004/0109210 A1 | 6/2004 | Yoshida | |
| 2007/0286655 A1 | 12/2007 | Wilson | |

* cited by examiner

*Primary Examiner* — Huan Tran

(57) ABSTRACT

First delay mechanisms to delay a beam-detect signal by different lengths of time in synchronization with a first clock signal. The beam-detect signal is generated responsive to one or more beams being output towards a rotating polygonal mirror having facets and directed towards a sensor. One or more second delay mechanisms each correspond to one of the beams to delay a second clock signal, resulting in a beam-clock signal to align the beam over successive reflections by the facets. A mechanism determines a delay by which each second delay mechanism is to delay the second clock signal, based on the beam-detect signal as differently delayed by the first delay mechanisms.

15 Claims, 8 Drawing Sheets

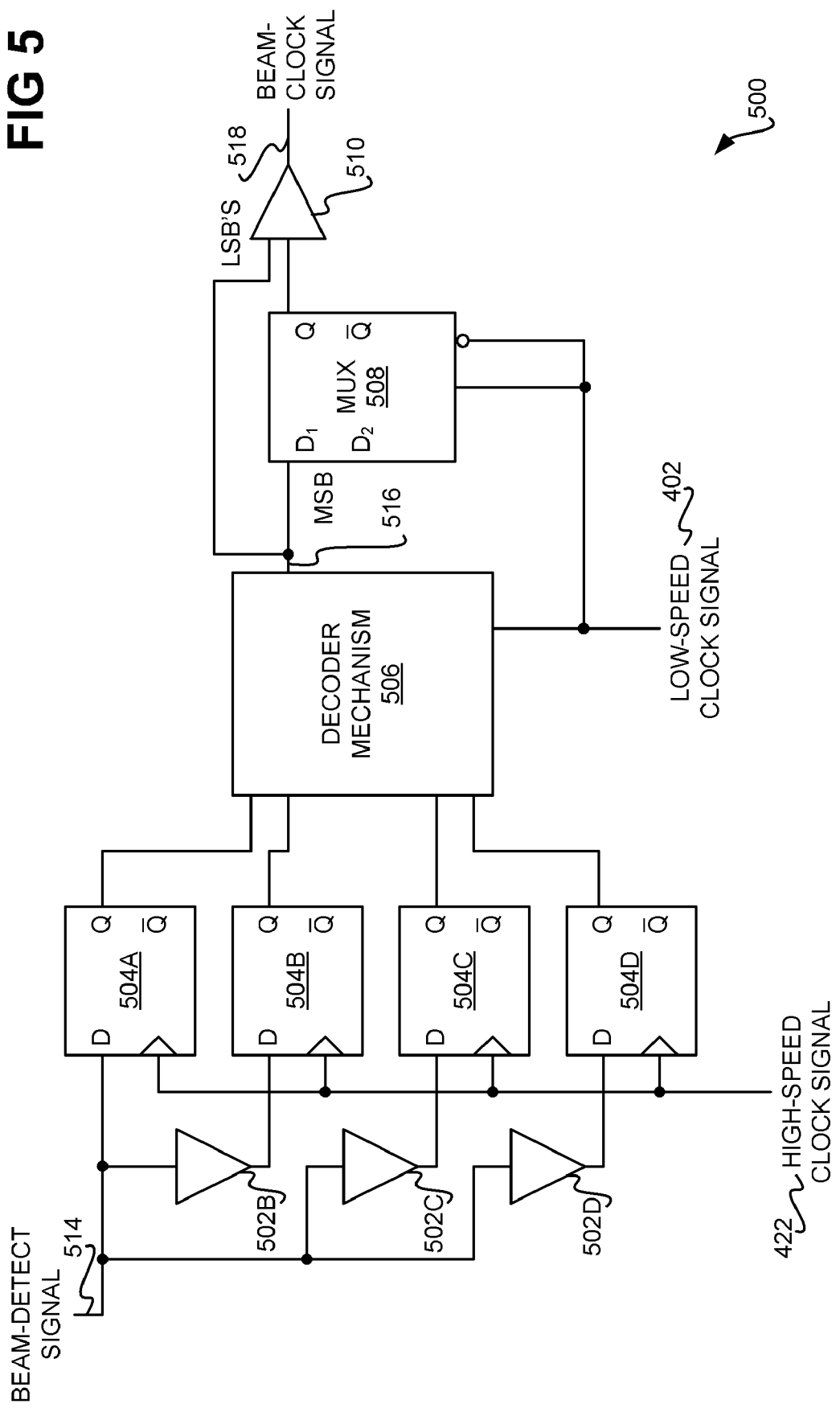

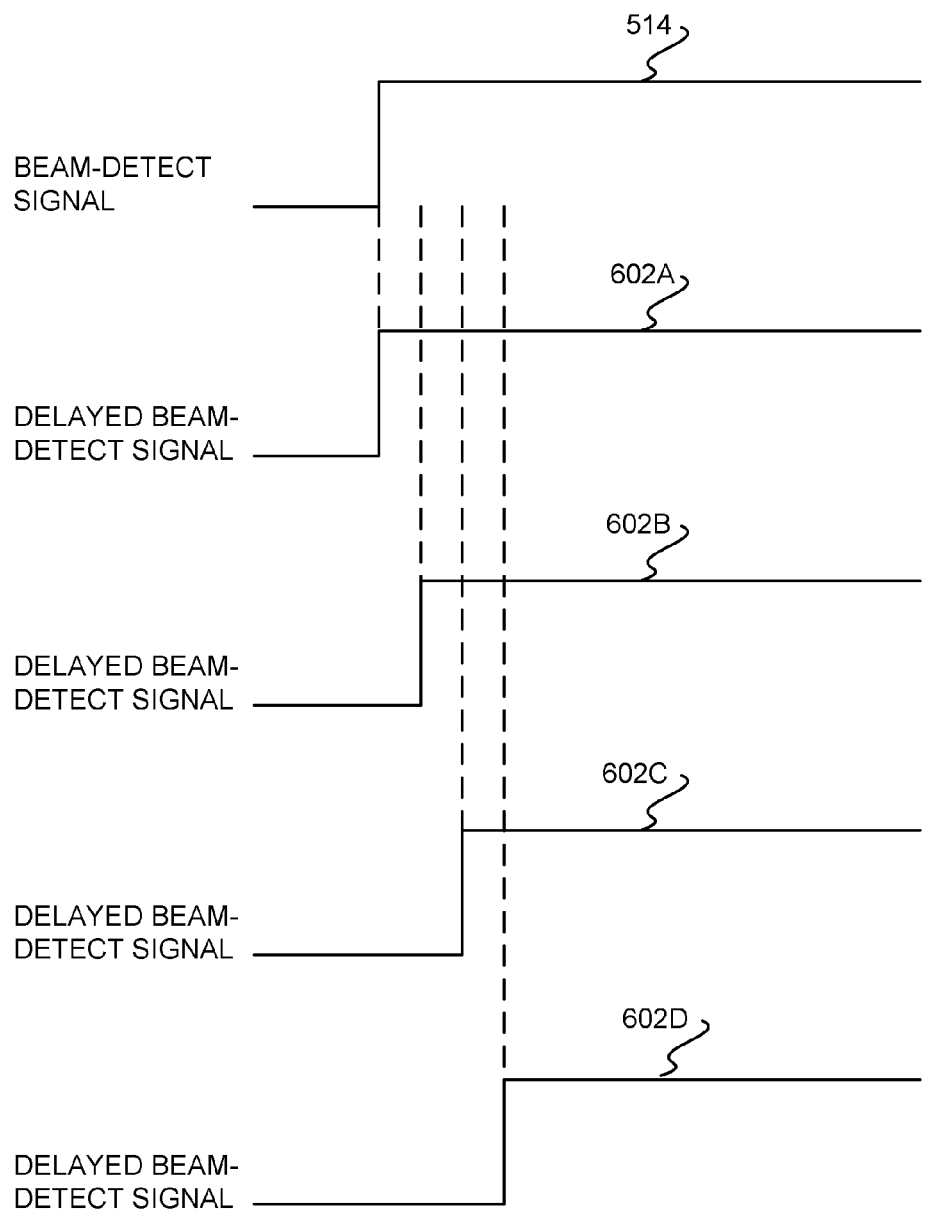

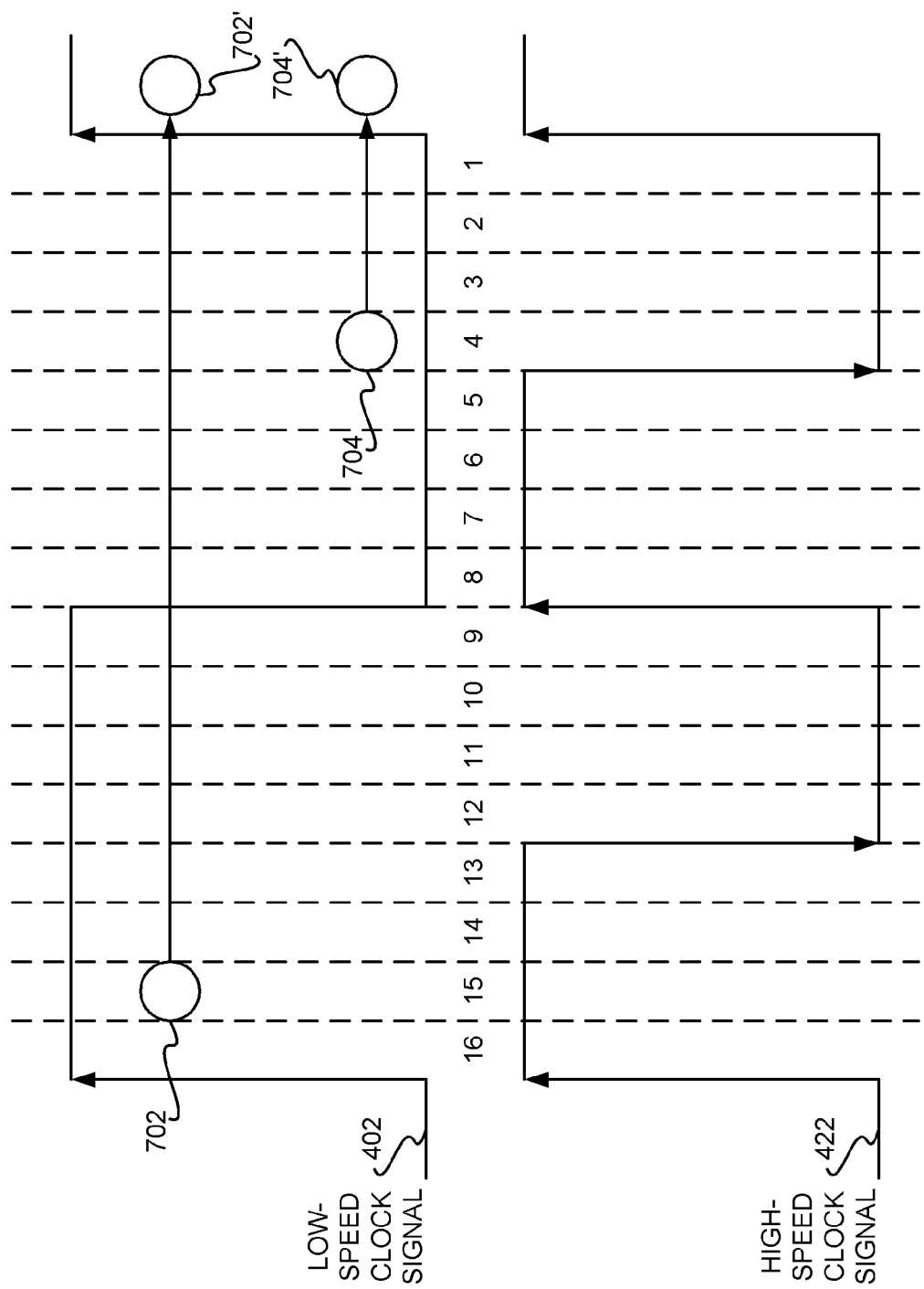

| CODE VALUE | MSB | LSB'S |
|---|---|---|
| 0 | 0 | 000 |
| 1 | 0 | 001 |
| 2 | 0 | 010 |
| 3 | 0 | 011 |
| 4 | 0 | 100 |
| 5 | 0 | 101 |
| 6 | 0 | 110 |
| 7 | 0 | 111 |
| 8 | 1 | 000 |
| 9 | 1 | 001 |
| 10 | 1 | 010 |
| 11 | 1 | 011 |
| 12 | 1 | 100 |
| 13 | 1 | 101 |
| 14 | 1 | 110 |
| 15 | 1 | 111 |

US 8,035,675 B2

ALIGNING BEAMS OVER SUCCESSIVE REFLECTIONS BY FACETS OF ROTATING POLYGONAL MIRROR

BACKGROUND

An electrophotographic printing device commonly employs one or more laser beams to selectively expose, on a scan line-by-scan line basis, positions on a photosensitive surface in correspondence with an image to be printed. For any given laser beam, the spot at which the laser beam illuminates the photosensitive surface within one scan line should be aligned with the corresponding spot at which the laser beam impinged the photosensitive surface within the previous scan line. Furthermore, for a group of laser beams, the spots at which the laser beams impinge the photosensitive surface within a given scan line should be aligned with one another (i.e., deskewed). If either or both of these conditions are not satisfied, image quality can be degraded.

BRIEF DESCRIPTION OF THE DRAWINGS

FIG. 5 is a diagram of a component that increases the precision by which beam spots are aligned and deskewed, according to an embodiment of the present disclosure.

FIG. 6 is a timing diagram depicting four of the signals within the component of FIG. 5, according to an embodiment of the present disclosure.

FIG. 7A is a diagram depicting how the location for two representative optical beams are corrected via the component of FIG. 5, according to an embodiment of the present disclosure.

FIG. 7B is a diagram depicting a look-up table that can be used by the decoder mechanism of FIG. 5, according to an embodiment of the present disclosure.

DETAILED DESCRIPTION OF THE DRAWINGS

Figure 1:
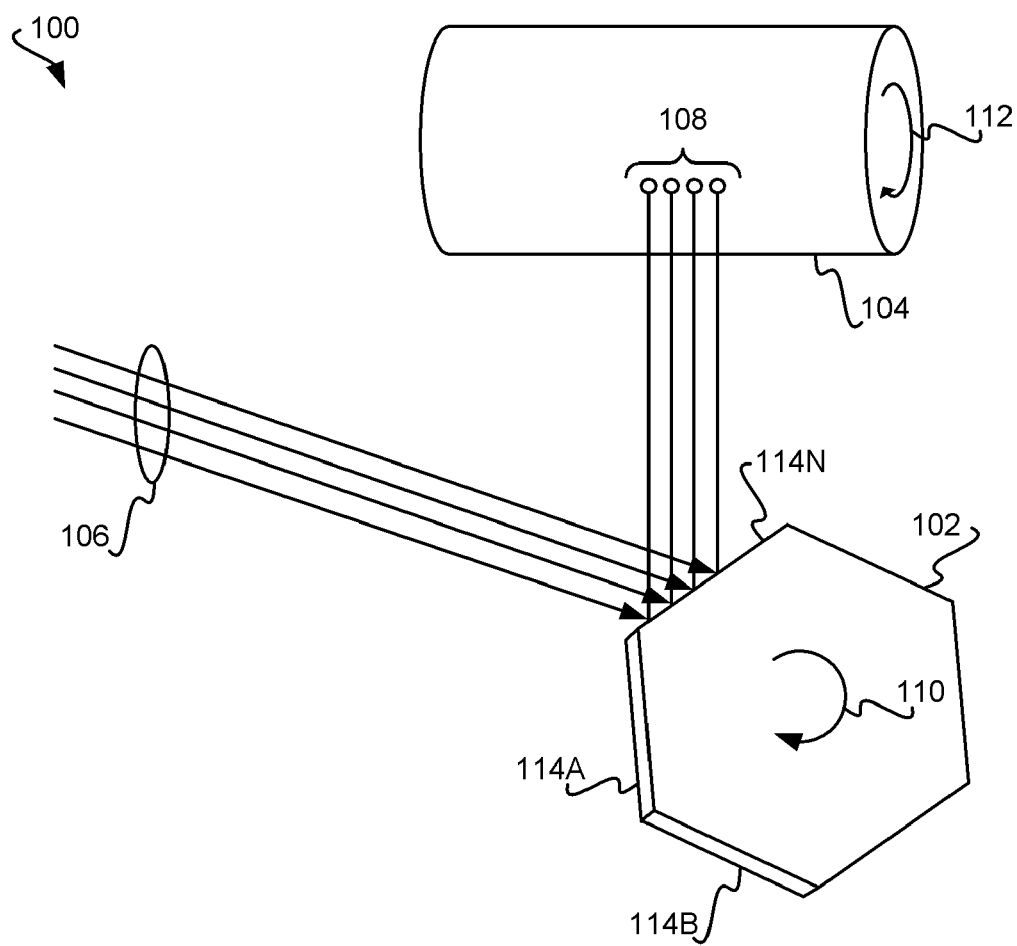
FIG. 1 is a diagram of a portion of a printing device in relation to which embodiments of the present disclosure can be implemented.

FIG. 1 shows a portion of a printing device 100, in relation to which embodiments of the present disclosure may be implemented. The printing device 100 is depicted in FIG. 1 as including a polygonal mirror 102 and a photosensitive surface 104, which in one embodiment can be a drum as specifically depicted in FIG. 1. Those of ordinary skill within the art can appreciate that the printing device 100 can and typically will include other components, in addition to and/or in lieu of those depicted in FIG. 1. For instance, the printing device 100 can and typically will include a number of lenses and mirrors other than the polygonal mirror 102, which are not shown in FIG. 1 for illustrative clarity and convenience.

The printing device 100 is more generally an image-forming device, in that it forms images (i.e., prints images) on media, such as sheets of paper. The printing device 100 may be an electrophotographic printing device in that it selectively charges or discharges the photoconductive surface 104 in correspondence with the image to be formed or printed, where this image may have been received as image data from a computing device, for instance. Examples of electrophotographic printing devices include laser printing devices using a dry electrophotographic process, which fuse dry toner onto media in accordance with image data to print the images, as well as liquid electrophotographic (LEP) printing devices, which apply at least semi-liquid ink or toner onto media in accordance with image data to print the images.

Within the printing device 100, a number of optical beams 106 are generated. The optical beams 106 may be laser beams, or other types of optical beams. While four optical beams 106 are depicted in FIG. 1, there may be less than four optical beams 106 (such as just one optical beam 106), or there may be more than four optical beams 106. It is noted, however, that having more optical beams is advantageous to increase the rate at which the printing device 100 is able to form images—that is, the speed at which the printing device 100 is able to print—which may be measured by pages-per-minute (PPM) or other units of performance.

The optical beams 106 are reflected by a polygonal mirror 102 or another type of scanning mechanism, exemplarily depicted in FIG. 1 as being a hexagon, although it can be another polygonal shape, such as a square, an octagon, and so on. The polygonal mirror 102 rotates, such as indicated by the arrow 110 in FIG. 1. The polygonal mirror 102 has a number of facets, or sides, 114A, 114B, . . . , 114N, collectively referred to as the facets 114. More specifically then, the optical beams 106 are reflected by the facets 114 of the polygonal mirror 102 towards the photosensitive surface 104 and scan across the surface 104. The facets 114 of the polygonal mirror 102 redirect the optical beams 106 towards the photosensitive surface 104, where they form what are referred to as beam spots 108 by modulating the source of the optical beams 106 on and off. The photosensitive surface 104, where it is implemented as a drum as in FIG. 1, also rotates, as indicated by the arrow 112.

The photosensitive surface 104, which may be in the form of a drum or a belt, may include a photoconductor. If so, the photoconductive surface 104 is initially charged positively or negatively, and at locations where the focused spots formed by optical beams 106 expose the drum, the photoreceptive surface 104 is discharged (i.e., from positive or negative to a reduced positive or negative charge). Ultimately in this embodiment, the photoconductive surface 104, or another type of photosensitive surface, is selectively charged or discharged in correspondence with image data for an image to be printed by the printing device 100. The optical beams 106 are selectively output in correspondence with scan lines of the image, where the image is composed of a number of such scan lines.

Selectively outputting the optical beams 106 includes modulation of the output power of optical beam sources that generate the optical beams 106 where such optical beam sources are not depicted in FIG. 1, for illustrative convenience. The rotating polygonal mirror 102 scans each optical beam 106 as selectively output onto a corresponding scan line on the photosensitive surface 104, to selectively expose positions on this scan line of the photosensitive surface 104. In an electrophotographic printer, the resulting exposure pattern on the photoconductive surface 104 is developed (or prevented from being developed) with toner or ink such that the toner or ink stays on the photoconductive surface where the photoconductive surface is discharged (or charged). The developed toner or ink image is then transferred to media, such as paper.

Figure 2A:
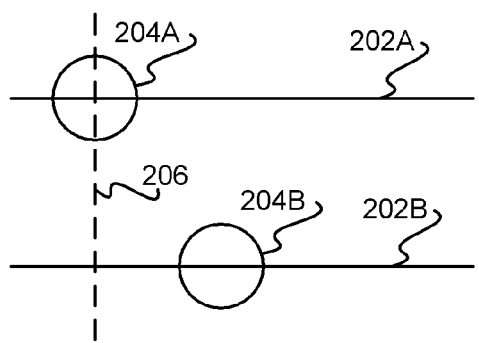
FIGS. 2A and 2B are diagrams of unaligned beam spots and aligned beam spots of consecutive scans, respectively, of a single optical beam, where embodiments of the present disclosure result in more accurate alignment of the beam spots.

FIG. 2A shows unaligned beam spots generated by a single optical beam over successive scan lines, which can be (correctly) aligned with relatively high precision by embodiments of the present disclosure. There are two scan lines 202A and 202B, collectively referred to as the scan lines 202, in FIG. 2A. The scan lines 202 correspond to successive facets of the rotating polygonal mirror 102. Thus, the first scan line 202A corresponds to one of the facets 114 of the polygonal mirror 102, and the second scan line 202B corresponds to an immediately successive facet of the polygonal mirror 102.

An example of vertical lines is explicitly depicted in FIGS. 2, 3, and 7 to make this mechanism more understandable. The optical beam results in a beam spot 204A along the first scan line 202A, and results in a corresponding beam spot 204B along the second scan line 202B, where the beam spots 204A and 204B are collectively referred to as the beam spots 204. Because the beam spot 204B corresponds to the beam spot 204A, if aligned the spot 204B would be located directly under the spot 204A, along the same dotted line 206 that is perpendicular to the scan lines 202. However, in FIG. 2A the optical beam generating the beam spots 204 is unaligned over successive reflections by the facets 114 of the polygonal mirror 102. This results in the beam spot 204B along the scan line 202B being unaligned in relation to the beam spot 204A along the scan line 202A.

Figure 2B:
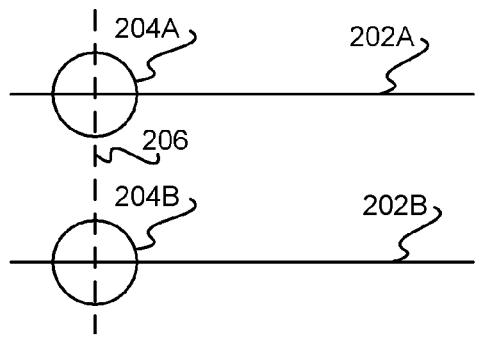

By comparison, FIG. 2B shows aligned beam spots generated by a single optical beam over successive scan lines, where embodiments of the present disclosure provide for relatively high precision in providing for such alignment. In FIG. 2B, the optical beam generating the beam spots 204 is aligned over successive reflections by the facets 114 of the polygonal mirror 102. As a result, the beam spot 204B along the scan line 202B is aligned in relation to the beam spot 204A along the scan line 202A. That is, the beam spot 204B is located along the same dotted line 206 along which the beam spot 204A is located.

Figure 3A:
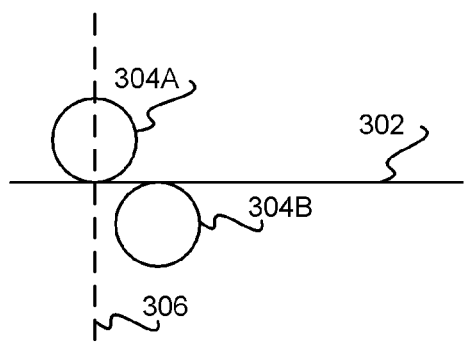
FIGS. 3A and 3B are diagrams of skewed and deskewed beam spots within a single scan, respectively, of multiple optical beams, where embodiments of the present disclosure result in accurate deskewing of the beam spots.

FIG. 3A shows skewed beam spots generated by multiple optical beams within a single scan line, which can be corrected with relatively high precision by embodiments of the present disclosure. There is one scan line 302, corresponding to one of the facets 114 of the polygonal mirror 102. A first optical beam results in a beam spot 304A along the scan line 302, whereas a second optical beam results in a beam spot 304B along the scan line 302, where the beam spots 304A and 304B are collectively referred to as the beam spots 304.

Therefore, if not skewed, the beam spot 304B would be located directly under the beam spot 304A, along the same dotted line 306 that is perpendicular to the scan line 302. However, in FIG. 3A the optical beam generating the beam spot 304B is skewed in relation to the optical beam generating the beam spot 304A of the scan line 302 that corresponds to reflection of these two optical beams by one of the facets 114 of the polygonal mirror 102. This results in the beam spot 304B being skewed in relation to the beam spot 304A along the scan line 302.

Figure 3B:
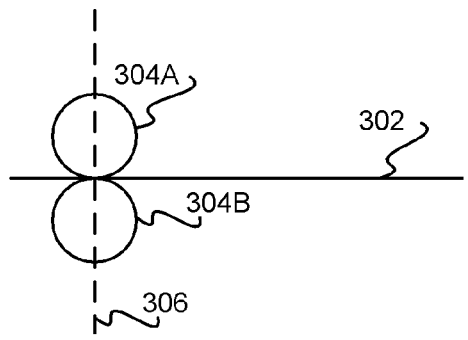

By comparison, FIG. 3B shows deskewed beam spots generated by multiple optical beams within a single scan line, where embodiments of the present disclosure provide for relatively high precision in providing for such deskewing to align the beam spots. In FIG. 3B, the optical beams generating the beam spots 304 are deskewed in relation to one another along the scan line 302 that corresponds to reflection of these two optical beams by one of the facets 114 of the polygonal mirror 102. As a result, the beam spot 304B is deskewed in relation to the beam spot 304A along the same scan line 302. That is, the beam spot 304B is located along the same dotted line 306 along which the beam spot 304A is located.

The optical beams 106 may be unaligned and skewed as a result of the physical imperfections of the facets 114 of the polygonal mirror 102, or due to misalignments of the sources of the optical beams 106, among other reasons. Ideally the polygonal mirror 102 is a perfect polygon, with perfectly flat facets 114 that are perfectly at the proper angles in relation to one another. However, manufacturing tolerances of the polygonal mirror 102 can result in less than a perfect polygon, with less than perfectly flat facets 114 that are less than perfectly at the proper angles in relation to one another. As a result, the optical beams 106 can be slightly unaligned and skewed.

Figure 4A:
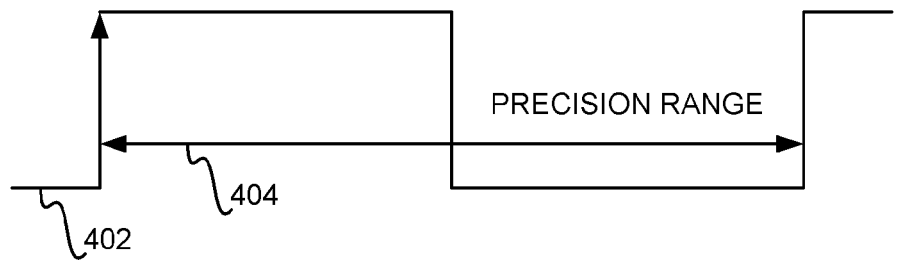
FIGS. 4A, 4B, 4C, and 4D are diagrams depicting how embodiments of the present disclosure result in the increased precision by which beam spots are aligned and deskewed.

FIGS. 4A, 4B, 4C, and 4D collectively show how an embodiment of the present disclosure provides for increased precision in providing for optical beam alignment and deskewing as has been described in relation to FIGS. 2A and 2B and FIGS. 3A and 3B. In FIG. 4A, a clock signal 402 is depicted. The polygonal mirror 102 may rotate synchronously or asynchronously to the clock signal 402.

The optical beams 106 can be aligned and deskewed within a range of precision denoted by the line 404, which corresponds to the period of the clock signal 402. That is, when aligning the optical beams 106 via accurate synchronization to a beam detect signal, the beam 106 can be aligned and deskewed to a degree of accuracy corresponding to the period of the clock signal 402. (It is noted that the beam-detect signal is generated by a beam-detect sensor, as is described later in the detailed description. For instance, the optical beams 106 are output towards the polygonal mirror 102 and directed towards such a beam-detect sensor after reflection by the mirror 102. The detection of the optical beams 106 by the beam-detect sensor results in the beam-detect signal. The beam-detect signal provides an accurate signal indicating the time that the polygon mirror 102 scans the optical beam across the beam-detect sensor.) This degree of precision is relatively imprecise, however. Fine alignment and deskewing is relatively impossible in this situation. Therefore, embodiments of the present disclosure provide for increasing the degree to which the optical beams 106 can be aligned and deskewed, by decreasing (i.e., improving) the range of imprecision denoted by the line 404.

Figure 4B:
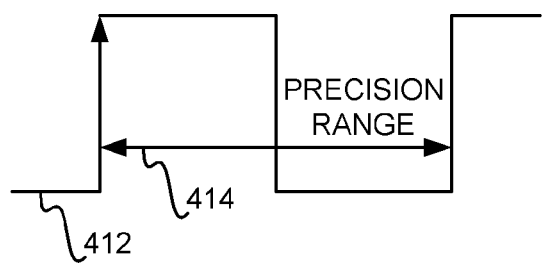

First, FIG. 4B shows how precision can be increased by a factor of F by increasing the operating frequency of the clock signal 402 to result in the clock signal 412, according to an embodiment of the present disclosure. Thus, the clock signal 412 has an operating frequency that is F times the operating frequency of the clock signal 402 of FIG. 4A. The operating frequency of a clock signal is the frequency at which a rising edge appears within the signal.

In the example of FIG. 4B, the frequency of the clock signal 412 has been increased by a factor of F=2 as compared to the clock signal 402 of FIG. 4A. As such, the period of the clock signal 412 is half that of the period of the clock signal 402, resulting in a range of imprecision denoted by the line 414 that is half the range of imprecision denoted by the line 404 in FIG. 4A. (That is, the optical beams 106 can be aligned and deskewed with a finer resolution of this range in FIG. 4B as compared to the range in FIG. 4A.) The result is that the optical beams 106 can be aligned and deskewed by a degree of precision in relation to the clock signal 412 that is twice the degree of precision as compared to the clock signal 402.

Ideally, the frequency of the clock signal 412 as compared to the frequency of the clock signal 402 of FIG. 4A could be increased by a sufficient factor to result in the desired increase in precision in aligning and deskewing the optical beams 106. For example, it may be desired that the optical beams 106 be aligned and deskewed to a degree of precision that is sixteen times better than the degree of precision afforded by the clock signal 402. However, increasing the frequency of the clock signal 412 to sixteen times the frequency of the clock signal 402 can be cost prohibitive if not nearly technologically impossible to achieve in some situations. Therefore, embodiments of the present disclosure employ other additional approaches to increase the degree of precision by which the optical beams 106 can be aligned and deskewed, in addition to increasing the frequency of the clock signal 402.

Figure 4C:
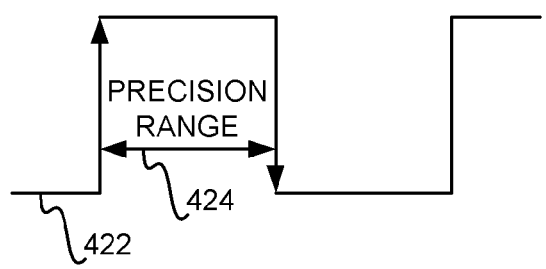

For instance, FIG. 4C shows how precision can be increased by an additional factor of two by having a clock signal 422 that uses a dual- or double-data rate (DDR) implementation, according to an embodiment of the present disclosure. In FIGS. 4A and 4B, the clock signals 402 and 412 are by comparison single-data rate (SDR) clock signals, meaning that the optical beams 106 are output, or modulated, in response to just the rising edge (or just the falling edge) of such an SDR clock signal within each period of the signal. By comparison, in FIG. 4C, the clock signal 422 is a DDR clock signal, meaning that the optical beams 106 are controlled in response to both the rising edge and the falling edge of the clock signal 422 within each period of the signal 422.

The operating frequency of the clock signal 422 is the same as the operating frequency of the clock signal 412 of FIG. 4B, such as F times that of the operating frequency of the clock signal 402 of FIG. 4A. However, the effective frequency of the clock signal 422 is 2F times that of the effective frequency of the clock signal 412. That is, the operating frequency of a clock signal is the frequency at which a rising edge appears within the signal, whereas the effective frequency of the clock signal is the frequency at which a selected event is caused to occur, such as the output, or modulation, of the optical beams 106. It is noted that the clock signal 422 may be the same clock signal as the clock signal 412, where the difference is the implementation of logic circuits that are sensitive either to just the rising edge thereof (SDR, in the case of the clock signal 412), or to both the rising and falling edges thereof (DDR, in the case of the clock signal 422).

More specifically, as to the clock signal 412 of FIG. 4B, the optical beams 106 are output, or modulated, for each rising edge of the signal 412, whereas when using the clock signal 422, the optical beams 106 are controlled for each rising edge and each falling edge of the signal 422. Because there is a total of two edges, one rising and one falling, within one period of the clock signal 422, this means that the effective frequency of the clock signal 422 is twice that of the clock signal 412. This is the case even though the operating frequency of the clock signal 422 is equal to that of the clock signal 412 (and even though the clock signal 422 may indeed be the same clock signal as the clock signal 412, as noted in the previous paragraph).

Thus, the degree of precision afforded by the clock signal 422 is twice that of the degree of precision afforded by the clock signal 412 of FIG. 4B, even where the clock signal 422 is the same clock signal as the clock signal 412. Stated another way, the range of imprecision denoted by line 424 is half that of the range of imprecision denoted by line 414 in FIG. 4B. This means that the optical beams 106 can be aligned and deskewed in accordance with the clock signal 422 to a degree of precision that is twice the degree of precision to which the beams 106 can be aligned and deskewed in accordance with the clock signal 412, and 2F—such as four where F=2—the degree of precision to which the beams 106 can be aligned and deskewed in accordance with the clock signal 402 of FIG. 4A.

Figure 4D:
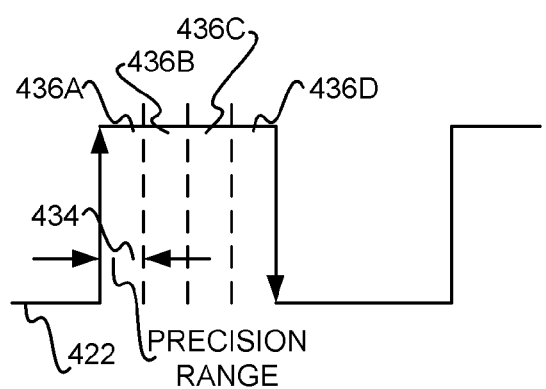

Finally, FIG. 4D shows an additional factor by which the degree of precision to which the optical beams 106 can be aligned and deskewed can be increased, according to an embodiment of the present disclosure. The clock signal 422 in FIG. 4D is the same clock signal 422 in FIG. 4C—a DDR clock signal in relation to which the optical beams 106 are output, or modulated, at both the rising edge and the falling edge of each period thereof. However, the length of time between the rising edge and the falling edge of the clock signal 422 (which is defined as the effective period of the clock signal 422) has been further divided into N equidistant sections 436, such as, for example, four sections 436A, 436B, 436C, and 436D in the example of FIG. 4D.

This means that the imprecision range denoted by line 434 is 1/N the imprecision range denoted by line 424 in FIG. 4C. As such, the degree of precision to which the optical beams 106 can be aligned and deskewed in relation to FIG. 4D is N times the degree of precision to which the optical beams 106 can be aligned and deskewed in relation to FIG. 4C. Therefore, comparing FIG. 4D to FIG. 4A, the degree of precision to which the optical beams 106 can be aligned and deskewed is increased by a factor of 2FN. For example, where F=2 and N=4, the resulting increase in precision is a factor of sixteen.

The process by which the length of time between the rising edge and the falling edge of the clock signal 422 can be divided into N equidistant sections 436 is described in more detail later in the detailed description. However, it is noted that in one embodiment, the clock signal 422 of FIGS. 4C and 4D augments the clock signal 402 of FIG. 4A, with the advantage that just part of the circuit must operate at the higher frequency. By comparison, in another embodiment, the clock signal 422 replaces the clock signal 402.

FIG. 5 shows an aligning and deskewing component 500 that provides for dividing the clock signal 422 into N separate sections 436 in FIG. 4D to increase the degree of precision to which the optical beams 106 can be aligned and deskewed by a factor of N, according to an embodiment of the present disclosure. FIG. 5 particularly shows the embodiment in which both the clock signal 402 of FIG. 4A and the clock signal 422 of FIG. 4D are present. The clock signal 422, in other words, can be employed just in the component 500 in this embodiment, and not in other components of the printing device of which the component 500 may be a part, thereby decreasing their maximum frequency performance requirements.

The component 500 includes a number of fixed (or programmable, but set to a constant value) delay elements 502B, 502C, and 502D, collectively referred to as the fixed delay elements 502, as well as a number of latches 504A, 504B, 504C, and 504D, collectively referred to as the latches 504. The fixed delay element 502B corresponds to the latch 504B, the fixed delay element 502C corresponds to the latch 504C, and the fixed delay element 502D corresponds to the latch 504D. As such, in the embodiment of FIG. 5, the latch 504A does not have a corresponding fixed delay element. In this embodiment more generally, there are N latches 504 and {N−1} fixed delay elements 502, where N corresponds to the number of sections 436 of FIG. 4D.

However, in another embodiment, the latch 504A may have a corresponding fixed delay element. In such an embodiment, there are N latches 504 and N fixed delay elements 502, where N again corresponds to the number of sections 436 of FIG. 4D. The delay elements 502 are fixed delay elements in that the delay that each such delay element introduces is fixed (i.e., constant). Furthermore, the latches 504 are synchronized to the high-speed clock signal 422 of FIGS. 4C and 4D that has been described.

It is noted that more generally, the latch 504B and the delay element 502B can be said to together correspond to a fixed delay mechanism, the latch 504C and the delay element 502C can be said to together correspond to a fixed delay mechanism, and the latch 504D and the delay element 502D can be said to together correspond to a fixed delay mechanism. The latch 504A by itself may correspond to a fixed delay mechanism. Alternatively, if there is a delay element for the latch 504A, then such a delay element and the latch 504A together correspond to the fixed delay mechanism in question.

A beam-detect signal 514 is input into the latches 504, where the signal 514 is delayed via the fixed delay elements 502 prior to being input into the latches 504B, 504C, and 504D. The beam-detect signal 514 is generated by a beam-detect sensor, which is not shown in FIG. 5. For instance, the optical beams 106 are output, or modulated, towards the polygonal mirror 102 and directed towards the beam-detector sensor after reflection by the polygonal mirror 102. The detection of the optical beam or beams 106 by the beam-detect sensor thus results in the beam-detect signal 514. Therefore, in certain areas of the scan format the optical beams 106 are directed towards the beam-detect sensor (instead of being directed towards the photosensitive surface 104) after reflection by the facets 114 of the rotating polygonal mirror 102. The beam-detect sensor detects the positions of optical beam spots thereon to align and deskew the beams 106.

The fixed delay element 502B delays the beam-detect signal 514 by one-quarter of the effective period of the clock signal 422 (i.e., one-quarter of the time period between the rising edge and the falling edge of the clock signal 422 in FIG. 4D). The effective period of the clock signal 422 is the inverse of the effective frequency of the clock signal 422, where the effective frequency of the clock signal 422 is defined as has been described above. The fixed delay element 502C delays the beam-detect signal 514 by one-half of the effective period of the clock signal 422. The fixed delay element 502D delays the beam-detect signal 514 by three-fourths of the effective period of the clock signal 422. In general, where there are M delay elements 502, each delay element delays the beam-detect signal 514 by K/(M+1) of the effective period of the clock signal 422, where K=1 for the first delay element, K=2 for the second delay element, and so on, until K=M.

In this way, the latches 504 output the beam-detect signal 514 as delayed by different lengths of time corresponding to the different sections 436 of FIG. 4D. For instance, the output of the latch 504A corresponds to the first section 436A. The output of the latch 504B corresponds to the second section 436B. The output of the latch 504C corresponds to the third section 436C, and the output of the latch 504D corresponds to the fourth section 436D. Thus, the delay mechanisms encompassing the latches 504 and the delay elements 502 implement one manner by which the degree of precision to which the output, or modulated, beams 106 can be aligned and deskewed can be increased by a factor of N, such as N=4 in the particular example of FIG. 5.

FIG. 6 shows how the beam-detect signal 514 is delayed via fixed delay elements 502 by different lengths of time, according to an embodiment of the present disclosure. The beam-detect signal 514 corresponds to detection of an optical beam, going from low to high. It is noted that the high-speed clock signal 422 (which is not depicted in FIG. 6) can be divided into N sections, such as four in one embodiment.

The signal 602A that is input into the latch 504A, which is not delayed by any of the fixed delay elements 502, is synchronized with the high-speed clock signal 422. The signal 602B output by the fixed delay element 502B represents the beam-detect signal 514 as delayed by a delay of 1/N, or one-fourth where N=4, of the effective period of the clock signal 422. The signal 602C output by the fixed delay element 502C represents the beam-detect signal 514 as delayed by a delay of 2/N, or one-half where N=4, of the effective period of the clock signal 422. The signal 602D output by the fixed delay element 502D represents the beam-detect signal 514 as delayed by a delay of 3/N, or three-fourths where N=4, of the effective period of the clock signal 422.

Referring back to FIG. 5, a decoder mechanism 506 receives the outputs from the latches 504 (i.e., the beam-detect signal 514, as delayed by different lengths of time and then synchronized with the high-speed clock signal 422). The decoder mechanism 506 further receives the low-speed clock signal 402 of FIG. 4A. (It is noted that the terminology "high-speed" and "low-speed" in describing the high-speed clock signal 422 and the low-speed clock signal 402, respectively, is intended solely to distinguish between the signals 422 and 402. That is, the signal 422 is high-speed in relation to the signal 402, and the signal 402 is low-speed in relation to the signal 422.)

In response, the mechanism 506 generates a control signal 516 that denotes the delay by which each of the optical beams 106 is to be delayed so that the optical beams 106 are aligned and deskewed, and thereby synchronized to the correct position along the scan line in question. There is a different control signal 516 for each optical beam, such that each optical beam can be delayed by a different length of time. The delay denoted by a control signal 516 indicates the delay by which the beam-clock signal 518 should be delayed in relation to the beam-detect signal 514 so that the optical beam to which the control signal 516 corresponds is aligned over successive reflections by the facets 114 of the polygonal mirror 102, and so that this optical beam is deskewed in relation to the other optical beams.

The control signal 516 for each optical beam has a number of bits that can represent the factor by which the imprecision range has been improved (i.e., decreased) from FIG. 4A to FIG. 4D. Thus, in the example that has been described, the control signal 516 has four bits. This is because the imprecision range has been decreased by a factor of sixteen from FIG. 4A to FIG. 4D; stated another way, the precision by which the optical beams 106 can be aligned and deskewed is increased by a factor of sixteen from FIG. 4A to FIG. 4D, as has been described. Because $2^4=16$, the control signal 516 for each optical beam thus has sixteen slots in this example. In general, the number of bits of the control signal 516 is the smallest number of bits C such that $2^C \geq 2$ FN.

FIG. 7A illustratively depicts how the control signals 516 for two representative optical beams generated by the mechanism 506 correct the position of the optical beam spots, according to an embodiment of the present disclosure. The low-speed clock signal 402 is depicted, as is the high-speed clock signal 422. Optical beam spot 702 refers to the first representative optical beam, and an optical beam spot 704 refers to the second representative optical beam. The mechanism 506 is able to adjust the temporal positions of the beam spots 702 and 704 in relation to the low-speed clock signal 402 with the precision indicated in FIG. 7A, based on the beam detect signal and the predetermined skew displacement between the spots. That is, each effective period of the high-speed clock signal 422 can be divided into four equidistant sections, such that one period of the low-speed clock signal 402 can be divided into sixteen equidistant sections, as depicted in FIG. 7A. Thus, by use of the output signals from the latches 504 (i.e., the beam-detect signal 514 as delayed by different lengths of time), the mechanism 506 is able to adjust the temporal position of each beam spot to within one-sixteenth of the period of the low-speed clock signal 402.

From this resolution of the temporal positions of the beam spots, the mechanism 506 therefore determines, via decoding, the delay by which each of the representative optical beams should be delayed so that the optical beams are aligned and deskewed. For example, the optical beam spot 702 may be fourteen sections from the end of the period of the low-speed clock signal 402, whereas the optical beam spot 704 is four sections from the end of the period of the clock signal 402. Therefore, delaying the optical beams responsible for the optical beam spots 702 and 704 by $14/16 (=7/8)$ and $4/16 (=1/4)$, respectively, of the period of the low-speed clock signal 402, when the optical beams are subsequently turned on to affect the photosensitive surface 114, they will be aligned and deskewed. That is, the subsequent optical beam spots that affect the charge on the photosensitive surface 114 will be temporally located as indicated by the optical beam spots 702' and 704' in FIG. 7A.

Therefore, the first optical beam is delayed by fourteen sections, such that the control signal 516 for the first optical beam is equal to 0x110 in binary. Similarly, the second optical beam is delayed by four sections, such that the control signal 516 for the second optical beam is equal to 0x0100 in binary. It is noted that each such control signal 516 has one most significant bit (MSB), which is 1 in the case of the first optical beam and 0 in the case of the second optical beam. Each control signal 516 also has a number of least significant bits (LSB's), such as three in the example that has been described, which are 110 for the first optical beam and 100 for the second optical beam.

Referring back to FIG. 5, how the decoder mechanism 506 can be implemented in one embodiment of the present disclosure is now described. A four-bit code value is generated internally by the decoder mechanism 506 based on the outputs of the latches 504. For example, each latch 504 may output four bits within each period of the slow-speed clock signal 402 to the decoder mechanism 506, for a total of sixteen bits. The decoder mechanism 506 translates these sixteen bits to a four-bit code value such that the four-bit code value indicates in which of sixteen time slots the rising edge of the beam-detect signal 514 occurred, as is now described in more detail.

The four bits output by the latch 504A may be A0, A1, A2, and A3, where A0 is the first clocked output, and A3 is the fourth clocked output of latch 504A within a sequence of four consecutive clock edges. The four bits output by the latch 504B may be B0, B1, B2, and B3; the four bits output by the latch 504C may be C0, C1, C2, and C3; and, the four bits output by the latch 504D may be D0, D1, D2, and D3. These sixteen bits in total are arranged by the decoder mechanism 506 in the order D0-C0-B0-A0-D1-C1-B1-A1-D2-C2-B2-A2-D3-C3-B3-A3, corresponding to sixteen time slots. The first bit that is one, where the previous bits are zero, indicates the corresponding time slot in which the rising edge of the beam-detect signal 514 occurred.

For example, if the rising edge of the beam-detect signal 514 occurs in the sixth time slot, then the bits D0, C0, B0, A0, and D1 are zero (i.e., the first five bits are zero), and the bits C1, B1, A1, D2, C2, B2, A2, D3, C3, B3, and A3 are one (i.e., the remaining eleven bits are one). The decoder mechanism 506 detects that the first bit that is one is the bit C1 within the order D0-C0-B0-A0-D1-C1-B1-A1-D2-C2-B2-A2-D3-C3-B3-A3. Because the bit C1 is the sixth bit, the resulting code value is five, since the bits are numbered from zero to fifteen. Because the sixteen bits are numbered from zero to fifteen, this means that the code value itself has four bits, because $2^4=16$, and the code value can take on a value between 0 and $2^4-1=15$.

FIG. 7B shows a look-up table 556 that can then be employed by the decoder mechanism 506 once the code value has been determined, according to an embodiment of the present disclosure. The look-up table 556 is employed to output the most-significant bit and the least-significant bits of the control signal 516. The look-up table 556 has three columns 558, 560, and 562, and sixteen rows 564A, 564B, ..., 564N, collectively referred to as the rows 564. The column 558 corresponds to the different permutations of the code value. As noted above, because there are four bits of the code value, the code value can have one of $2^4=16$ different values, and this is why there are sixteen rows 564. One of the rows 564 is selected that has the current code value, based on the current bits of the code value.

The most-significant bit within the column 560 of the selected row is output as the most-significant bit of the control signal 516. Likewise, the least-significant bits within the column 562 of the selected row are output as the least-significant bits of the control signal 516. In this way, the decoder mechanism 506 is able to decode the code value. Those of ordinary skill within the art can appreciate that other approaches can be employed to implement the decoder mechanism 506, in addition to and/or in lieu of a look-up table 556. The data in rows 560 and 562 may be different for each optical beam in order to implement different magnitudes of deskew for each optical beam.

Referring back to FIG. 5, for each optical beam, there is a programmable delay mechanism, 508 and 510, within the component 500 of FIG. 5. These delay mechanisms are not to be confused with the fixed delay mechanisms that encompass the latches 504 and the fixed delay elements 502 that have been described. In FIG. 5, one such programmable delay mechanism is depicted, as exemplarily including a multiplexer 508 and a programmable delay element 510. Thus, this programmable delay mechanism corresponds to one of the optical beams 106. The programmable delay mechanisms for the other optical beams 106 are not depicted in FIG. 5 for illustrative clarity. All the programmable delay mechanisms for the optical beams 106 operate in the same way, however.

The control signal 516 for a given optical beam is output by the mechanism 506 and is divided into its MSB to control programmable delay multiplexer 508 and its LSB's to control the programmable delay element 510. The multiplexer 508 outputs the low-speed clock signal 402 where the MSB of the control signal 516 is zero, and outputs the low-speed clock signal 402 180 degrees out of phase where the MSB of the control signal 516 is one. Thus, where the MSB is zero, the multiplexer 508 outputs the low-speed clock signal 402, and where the MSB is one, the multiplexer 508 outputs the low-speed clock signal 402 delayed by one-half of the period of the clock signal 402.

The output of the multiplexer 508 is input into the programmable delay element 510. The programmable delay element 510 delays the output of the multiplexer 508 by T-sixteenths of the period of the low-speed clock signal 402, where T is equal to the value represented by the LSB's. Thus, where the LSB's are equal to 0x111—their maximum value—the programmable delay element 510 maximally delays the output of the multiplexer 508 by $7/16$ of the period of the low-speed clock signal 402. The programmable delay mechanism encompassing the multiplexer 508 and the programmable delay element 510 therefore can as a whole delay the low-speed clock signal 402 by anywhere from 0/16 to 15/16 of the period of the low-speed clock signal 402 in the example being described, corresponding to the value of the control signal 516 being anywhere from 0x0000 to 0x1111.

The output of the programmable delay element 510 (i.e., the output of the programmable delay mechanism of which the element 510 is a part) is indicated as a beam-clock signal 518. The optical beam to which the programmable delay mechanism corresponds is turned on or off at the rising edge (or, alternatively, at the falling edge) of the beam-clock signal 518, such that the optical beam is directed towards the photosensitive surface 104 to change the charge on the surface 104 as desired. Because the beam-clock signal 518 is a delayed signal, as programmed by the mechanism 506, the optical beam output, or modulated, as a result of the beam-clock signal 518 is aligned in relation to previous scan lines of the optical beam, and is deskewed in relation to other optical beams on the same (current) scan line.

Therefore, as a whole, the component 500 works as follows. The beam-detect signal 514 goes high once per facet of the revolving polygon at the beginning of each scan, before the print format area is reached. The fixed delay elements 502 and the latches 504 divide each equivalent period of the high-speed clock signal 422 into four sections (or more generally, N sections). In response, the mechanism 506 determines the delay to be introduced in the beam-clock signal 518 as a response to the beam-detect signal 514 for each optical beam so that the optical beam is subsequently deskewed and aligned. The mechanism 506 programs a programmable delay mechanism (e.g., the multiplexer 508 and the programmable delay element 510) for each optical beam with the appropriate delay. As such, the beam-clock signal 518 output for each optical beam may be different, and causes the optical beam in question to be subsequently turned on such that the optical beam is aligned and deskewed when affectedly illuminating the photosensitive surface 114.

The embodiment of FIG. 5 that has been described uses both the high-speed clock signal 422 as well as the low-speed clock signal 402. As has been noted, this can be advantageous so that just the component 500 has to be designed for the high-speed clock signal 422. However, as has also been noted, in another embodiment, the low-speed clock signal 402 may not be present throughout the printing device of which the high-speed clock signal 422 is a part, such that there is just one clock signal, the high-speed clock signal 422. The component 500 is somewhat simplified in this embodiment.

For example, the control signal 516 for each optical beam may just be two bits in the example that has been described, because each effective period of the clock signal 422 is delayed by zero to $2^2-1=3$ quarter-sections of this period (i.e., corresponding to the four sections into which the clock signal 422 is divided). More generally, the control signal 516 in this embodiment has a smallest number of bits C such that $2^C \geq N$, the number of sections into which the clock signal 422 has been divided. Therefore, the presence of the multiplexer 508 may be unnecessary, such that each programmable delay mechanism may be said to include just the programmable delay element 510, where the element 510 receives all the bits of the control signal 516. (Furthermore, even in the embodiment where both the low-speed clock signal 402 and the high-speed clock signal 422 are employed, the multiplexer 508 may be unnecessary if the programmable delay element 510 has a sufficient range of delays to be able to handle all the bits of the control signal 516, as opposed to just the LSB's of the control signal 516.)

Figure 8:
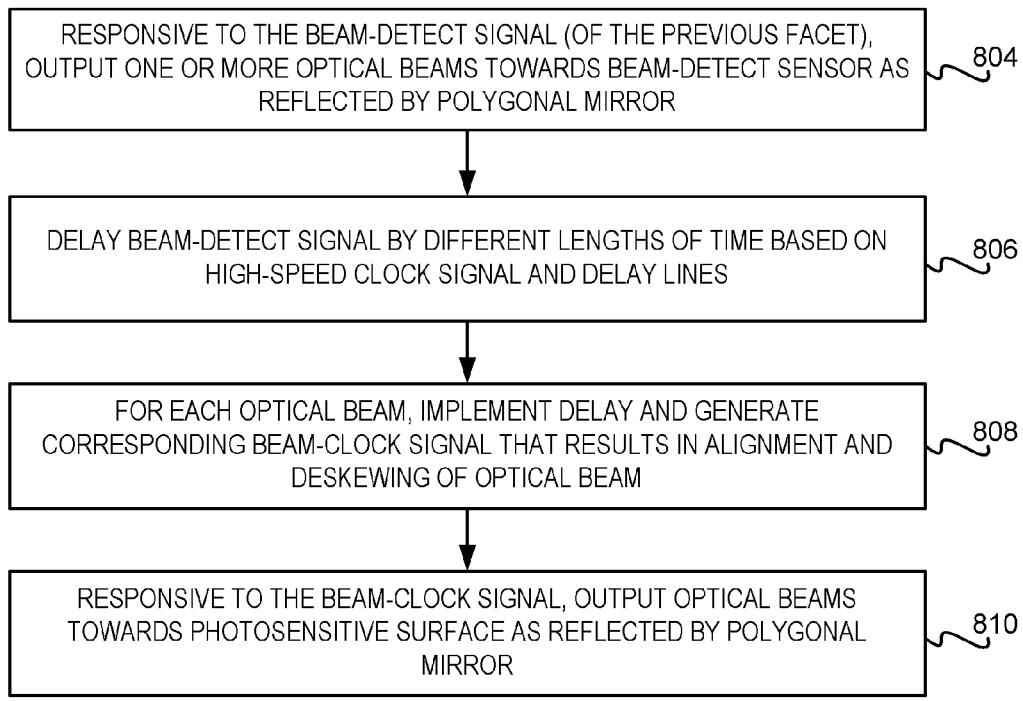
FIG. 8 is a flowchart of a method, according to an embodiment of the present disclosure.

FIG. 8 shows a method 800 summarizing the operation of the component 500 of FIG. 5, according to an embodiment of the present disclosure. (It is noted that the method 800 can be considered as a method that accurately aligns beam spot locations between scans of the optical beams, and also can be used for multiple optical beam systems to accurately align and deskew beam spot locations within each scan.) The optical beams 106 are output, or modulated, towards the polygonal mirror 102 and directed towards a beam-detect sensor after reflection by the polygonal mirror 102 (804). The beam-detect sensor generates the beam-detect signal 514 that has been described. The beam-detect signal 514, delayed by different lengths of time, is synchronized with the high-speed clock signal 422 (806). In particular, the fixed delay mechanisms encompassing the fixed delay elements 502 and the latches 504 perform part 806 of the method 800.

Thereafter, for each optical beam, a delay is implemented and is used to generate a beam-clock signal that results in the optical beam being aligned and deskewed (808). For instance, the mechanism 506 determines the delay for each optical beam based on the beam-detect signal 514 for the optical beam, on the pre-determined deskew value for that optical beam, on the low-speed clock signal 402, and on the high-speed clock signal 422, as has been described above in relation to FIG. 7A. The resulting control signal 516 generated by the mechanism 506 is used to control a programmable delay mechanism for the optical beam in question, where this programmable delay mechanism can include the multiplexer 508 and the programmable delay element 510. The output of the programmable delay element 510 is thus the beam-clock signal 518 for the optical beam.

In response to the beam-clock signals 518 for the optical beams, the optical beams 106 are output again, reflected by the polygonal mirror 102, and directed towards the photosensitive surface 104 (810). The output, or modulation, of the optical beams 106 in response to the beam-clock signals 518 results in the optical beams being deskewed and aligned, due to the delays introduced into the beam-clock signals 518.

The output, or modulation, of the optical beams 106 in response to the beam-clock signals 518 differs from their output, or modulation, in the area corresponding to the rising edge of the beam-detect signal 514 in any of a number of different ways. As just one example, the optical beams 106 in the area corresponding to the rising edge of the beam-detect signal 514 may be blocked from illuminating the photosensitive surface 104 prior to alignment and deskewing so that it does not actually change the charge on the surface 104. Thereafter, in response to the beam-clock signals 518, the optical beams 106 may be output, or modulated, at higher power, such that their impingement on the photosensitive surface 104 does change the charge on the surface 104 once the beams 106 are aligned and deskewed.

Figure 9:
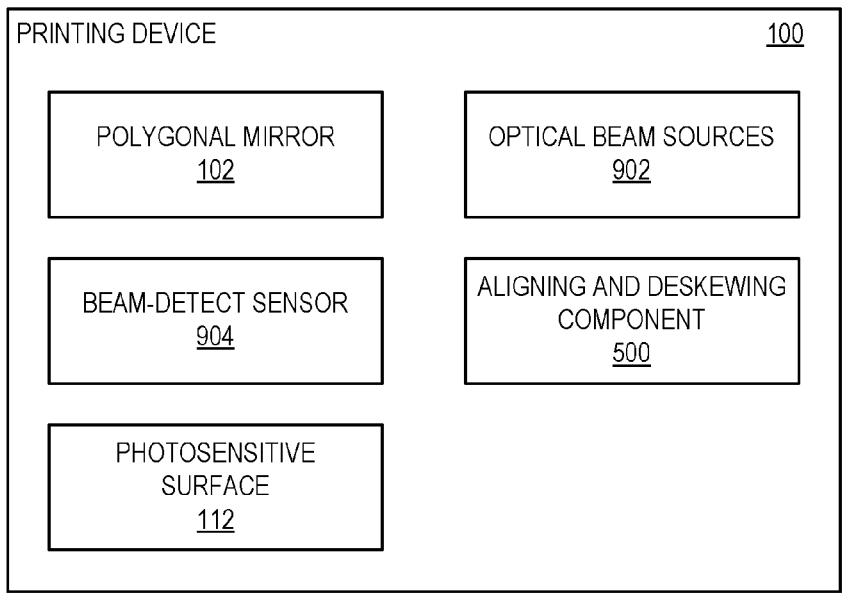
FIG. 9 is a block diagram of a portion of a rudimentary printing device, according to an embodiment of the present disclosure.

In conclusion, FIG. 9 shows a rudimentary block diagram of the printing device 100, according to an embodiment of the present disclosure. The printing device 100 is depicted in FIG. 9 as including the polygonal mirror 102, one or more optical beam sources 902, a beam-detect sensor 904, the aligning and deskewing component 500, and the photosensitive surface 112. However, those of ordinary skill within the art can appreciate that the printing device 100 may include other mechanisms, parts, and components, in addition to and/or in lieu of those depicted in FIG. 9. The polygonal mirror 102 has the facets 114 that have been described.

The optical beam sources 902 generate the optical beams 106 that have been described. The beam-detect sensor 904 detects the optical beams 106 as directed thereto after reflection by the polygonal mirror 102. The sensor 904 correspondingly generates the beam-detect signal 514 that has been described. The aligning and deskewing component 500 aligns the optical beams 106 by generating corresponding beam-clock signals 518 with a precision greater than the period of the low-speed clock signal 402 by using the high-speed clock signal 422 and delays whose magnitude is based on the sampling and decoding mechanisms, and based on the beam-detect signal 514, as has been described. Finally, the photosensitive surface 104 is that to which the optical beams 106 are directed after reflection by the polygonal mirror 102 in response to the beam-clock signals 518 generated by the component 500.

We claim:

1. An apparatus comprising:
a plurality of first delay mechanisms to delay a beam-detect signal by different lengths of time in synchronization with a first clock signal, the beam-detect signal generated responsive to one or more beams being output towards a rotating polygonal mirror having a plurality of facets and directed towards a sensor;
one or more second delay mechanisms, each second delay mechanism corresponding to one of the beams to delay a second clock signal, resulting in a beam-clock signal to align the beam over successive reflections by the facets; and,
a mechanism to determine a delay by which each second delay mechanism is to delay the second clock signal, based on the beam-detect signal as differently delayed by the first delay mechanisms.

2. The apparatus of claim 1, wherein the apparatus is part of an image-forming device also comprising the rotating polygonal mirror and a photosensitive surface to which beam-on signals cause the beams as reflected by the facets to be directed, such that the beams change a charge of the photosensitive surface where the beams impinge the photosensitive surface, where the beam-on signals are controlled synchronously by a beam-clock signal.

3. The apparatus of claim 1, wherein the one or more beams comprise a plurality of beams, such that the beam-clock signals generated by the second delay mechanisms further deskew the beams in relation to one another.

4. The apparatus of claim 1, wherein at least one of the first delay mechanisms comprises:
a delay element to delay the beam-detect signal by a fixed length of time; and,
a latch to latch the beam-detect signal.

5. The apparatus of claim 1, wherein the mechanism programs each second delay mechanism with a delay signal having one or more most-significant bits and one or more least-significant bits, each second delay mechanism comprising:
a programmable delay element programmed by a corresponding delay corresponding to the least-significant bits of the delay signal.

6. The apparatus of claim 5, wherein each second delay mechanism further comprises a latch responsive to the most-significant bits of the delay signal.

7. The apparatus of claim 1, wherein the first clock signal is at a higher frequency than the second clock signal is.

8. The apparatus of claim 1, wherein the first clock signal is at a same frequency as the second clock signal is.

9. The apparatus of claim 1, wherein the first clock signal is at a higher frequency than the second clock signal by a factor of 2F due to the first clock signal having an operating frequency that is F times an operating frequency of the second clock signal and clocks a double-data rate (DDR) implementation where the first clock signal clocks a single-data rate (SDR) implementation.

10. The apparatus of claim 9, wherein the plurality of first delay mechanisms comprise N first delay mechanisms dividing a period of the first clock signal into N equally spaced sub-periods, such that the beams are aligned over successive reflections by the facets with a precision that is 2FN times more precise as compared to using the second clock signal alone.

11. The apparatus of claim 10, wherein F is equal to two and N is equal to four, such that the precision by which the beams are aligned over successive reflections by the facets is sixteen times more precise as compared to using the second clock signal alone.

12. An image-forming device comprising:
a polygonal mirror having a plurality of facets;
one or more optical beam sources to output one or more optical beams towards the polygonal mirror;
a beam-detect sensor to detect the optical beams as directed to the beam-detect sensor after reflection by the polygonal mirror and responsively to generate a beam-detect signal corresponding to the optical beams as detected;
a component to align the optical beams via generation of one or more beam-clock signals corresponding to the optical beams with a more precise precision than a period of the second clock signal by using the first clock signal, based on the beam-detect signal generated by the beam-detect sensor; and,
a photosensitive surface to which the optical beams are directed after reflection by the polygonal mirror in response to the beam-clock signals generated by the component.

13. The image-forming device of claim 12, wherein the one or more optical beams comprise a plurality of optical beams, such that the beam-on signals generated synchronously to a beam-clock signal by the component further deskew the optical beams in relation to one another as reflected by the polygonal mirror.

14. The image-forming device of claim 12, wherein the component comprises:
a plurality of first delay mechanisms to delay the beam-detect signal by different lengths of time in synchronization with the first clock signal;
one or more second delay mechanisms, each second delay mechanism corresponding to one of the optical beams to delay the second clock signal, resulting in the beam-clock signal to align the optical beams over successive reflections by the facets; and,
a mechanism to receive the beam-detect signal to determine a delay by which each second delay mechanism is to delay the second clock signal based on the beam-detect signal as differently delayed by the first delay mechanisms.

15. A method comprising:
outputting one or more optical beams towards a rotating polygonal mirror having a plurality of facets synchronized with a second clock signal having a frequency less than a frequency of a first clock signal, the optical beams directed towards a beam-detect sensor after reflection by the rotating polygonal mirror, the beam-detect sensor to generate a beam-detect signal corresponding to the optical beams;
delaying the beam-detect signal by different lengths of time in synchronization with the first clock signal;

implementing for each optical beam a delay by which to delay the second clock signal to generate a beam-clock signal for the optical beam to align the beam over successive reflections by the facets, the delay being implemented based on the beam-detect signal as differently delayed; and, responsive to the beam-clock signal for each optical beam, outputting the optical beam towards the rotating polygonal mirror, the optical beam directed towards a photosensitive surface after reflection by the rotating polygonal mirror.

* * * * *